United States Patent [19]

Hotaling et al.

[11] Patent Number: 5,124,912
[45] Date of Patent: Jun. 23, 1992

[54] MEETING MANAGEMENT DEVICE

[75] Inventors: Brock Hotaling; Sighle Denier, both of Lowell; Gerald J. Ottaviano, Burlington; George Demetriou, Westford, all of Mass.

[73] Assignee: Wang Laboratories, Inc., Lowell, Mass.

[21] Appl. No.: 50,796

[22] Filed: May 15, 1987

[51] Int. Cl.⁵ .................. G06F 15/22; G06F 15/24; G06G 7/52
[52] U.S. Cl. .................. 364/401; 364/407; 40/107
[58] Field of Search .......... 364/401, 407; 340/706, 340/700; 40/107; 368/41

[56] References Cited

U.S. PATENT DOCUMENTS

| | | | |
|---|---|---|---|
| 4,162,610 | 7/1979 | Levine | 368/41 |
| 4,548,510 | 10/1985 | Levine | 368/41 |
| 4,591,840 | 5/1986 | Curtis et al. | 340/706 |
| 4,626,836 | 12/1986 | Curtis et al. | 340/706 |

Primary Examiner—Dale M. Shaw
Assistant Examiner—Laura Brutman
Attorney, Agent, or Firm—Michael H. Shanahan

[57] ABSTRACT

A meeting management device of a computer system determines the optimal meeting date and time for a specified group of invitees within a set of specified time parameters. A subset of the invitees are designated as critical along with any specified pieces of equipment and desired meeting sites. Remote from personal calendars of the invitees, the device compares available dates and times of each critical invitee with each other and that of any critical pieces of equipment and meeting sites. The comparison determines common available dates and times in which to schedule the meeting. Available or unavailable dates and times of each invitee are defined in part by the invitee and in part by other scheduled meetings to which the invitee has been invited. The invitee may define available or unavailable dates and times automatically through his personal calendar or manually to mirror as much of his calendar as desired.

45 Claims, 15 Drawing Sheets

```
         1         2         3         4         5         6         7         8
1234567890123456789012345678901234567890123456789012345678901234567890123456789 0
Time Management: Scheduling            Monday 07/22/85    2:15 pm For: John Smith Meeting Management
_____

|  Group Meeting
                    |  Scheduling Meeting
                    |  Status Meeting _____
                                                                    (- End -)
(RETURN) Modify Mtg.     (5) Next                         (13) Instructions
(2) First                (6) Add Meeting
(3) Last                 (8) Delete Mtg.                  (15) Print
(4) Previous                                              (16) Exit
```

```
          1         2         3         4         5         6         7         8
 1234567890123456789012345678901234567890123456789012345678901234567890123456789 0
 ***************************************************************************** *
 Time Management: Scheduling Entry                       Monday 07/22/85   2:15 pm For: John Smith
 _____

Meeting Name:           _____
 Duration (HH MM):       07 23 85  to  07 29 85
 Date (MM DD YY):        08 00 AM  to  05 00 PM
 Time (HH MM):
 Number of Participants: _____
 Conference Room:        _____                                      Critical X_
 Room Capacity:          _____
 Equipment:              _____                                      Critical X_

Percent for Acceptance:  100 %
 Blocked (B) or Unblocked (U):    X B    U
                               S _ M X T X W X T X F X S _
 Days to Search:

(RETURN) Save          (5) Process Sched.   (9) Select Part.   (13) Instructions (3) Select Conf. Rm.                                           (15) Print
 (4) Select Equipment   (8) Delete Mtg.                         (16) Exit

MEETING_STRUCT

| | | | |
|---|---|---|---|
| mtg_key | [32] | equip_name | [24] |
| date_strt | [6] | equip_crit | [1] |
| date_end | [6] | pct_accept | [3] |
| duration | [4] | blocked | [1] |
| time_strt | [4] | days_search | [7] |
| time_end | [4] | lst_people | [100][8] |
| num_parts | [3] | lst_crit_flags | [100][1] |
| conf_name | [24] | lst_conf_rms | [36][8] |
| conf_crit | [1] | lst_equip | [5][8] |
| conf_cap | [4] | | |

31 →

SCHED_STRUCT

| | |
|---|---|
| permid_key | [8] |
| public_tmpl | [966] |
| private_tmpl | [966] |
| last_roll_date | [6] |
| record_type | [1] |

```
         1         2         3         4         5         6         7         8
12345678901234567890123456789012345678901234567890123456789012345678901234567890
================================================================================
Corporate Directory: People                          Monday  07/22/85   2:15 pm Enter a non-blank character next to the desired name Name                    Organization     Location    Job Description
    ────                    ────────────     ────────    ───────────────
X   Group Administrator     VS4              AREA 21     TESTER
X   Biff Adico              VS4              AREA 21
X   Chuck Bain              VS4              AREA 21
X   Katie Braun             VS4              AREA 21
X   Joan Dasiel             VS4              AREA 21     TESTER
X   Kim Doore               VS4              AREA 21     TESTER
X   Karen Navy              VS4              AREA 21     TESTER
X   Cane Rean               VS4              AREA 21     TESTER
X   George Semetrio         VS4              AREA 21     TESTER
X   Righle Venter           VS4              AREA 21     TESTER
    Mary Yunn               VS4              AREA 21

(- End -)
(RETURN) Accept    (5) Next          (9)  Find         (13) Instructions
(2) First          (6) Mark All      (10) Change View  (14) Recipients
(3) Last           (7) Clear All                       (16) Exit
```

```
         1         2         3         4         5         6         7         8
1234567890123456789012345678901234567890123456789012345678901234567890123456789012345678 90
**********************************************************************************
Time Management: Participant Selection              Monday 07/22/85    2:15 pm C/N   Name                  Organization   Location       Job Description C    Group Administrator        VS4        AREA 21        TESTER
 C    Biff Adico                 VS4        AREA 21
 C    Chuck Bain                 VS4        AREA 21
 N    Katie Braun                VS4        AREA 21
 N    Joan Dasiel                VS4        AREA 21        TESTER N    Karen Navy                 VS4        AREA 21        TESTER
 N    Cane Rean                  VS4        AREA 21        TESTER
 C    George Semetrio            VS4        AREA 21        TESTER
 C    Righle Venter              VS4        AREA 21        TESTER (- End -)
(RETURN) Save        (5) Next             (9) Select Part.    (13) Instructions
(2) First                                                     (15) Print
(3) Last                                                      (16) Exit
(4) Previous
```
↙ 35

FIG. 6b

```
          1         2         3         4         5         6         7         8
 1234567890123456789012345678901234567890123456789012345678901234567890123456789 0
 ................................................................................
Time Management: Conference Room Selection        Monday  07/22/85    2:15 pm Enter an 'X' next to the desired Conference Room Room                  Location        Capacity
X Conference Rm A    B1 F1    Building 1      50
X Conference Rm D    B1 F1    Building 1     100
X Conference Rm 1    B1 F3    Building 1      25
X Conference Rm 1    B1 F4    Building 1      20
X Conference Rm 3    B1 F4    Building 1      15
- Conference Rm 3    B2 F1    Building 2     250
- Conference Rm F    B3 F1    Building 3      10
```

(- End -)

(RETURN) Accept        (5) Next           (13) Instructions
(2) First              (6) Mark All
(3) Last               (7) Clear All      (15) Print
(4) Prev                                  (16) Exit

```
            1         2         3         4         5         6         7         8
   1234567890123456789012345678901234567890123456789012345678901234567890123456789012345678890
   ========================================================================================
   Time Management: Conference Room Selection          Monday 07/22/85   2:15 pm Room                Location      Capacity
   Conference Rm A     B1 F1            50
   Conference Rm D     B1 F1           100
   Conference Rm 1     B1 F3            25
   Conference Rm 1     B1 F4            20
   Conference Rm 3     B1 F4            15
```

```
                                                                              (- End -)
(RETURN) Save           (5) Next       (9) Select Conf. Rm.    (13) Instructions
(2) First
(3) Last                                                       (15) Print
(4) Previous                                                   (16) Exit
```

```
         1         2         3         4         5         6         7         8
1234567890123456789012345678901234567890123456789012345678901234567890123456789 0
***************************************************************************** *
Time Management: Equipment Selection          Monday  07/22/85    2:15 pm Enter an 'X' next to the desired Equipment Equipment              Location      Control Number    Serial Number X  Film Projector      8th floor           3               2365p
X  Overhead Projector  8th floor           3               2365p
-  Overhead Projector  8th floor         109               2344p
-  Overhead Projector  8th floor         143               7654p
-  Video Cassette Rec. 8th floor          47               3421v
-  Wide Screen Monitor 8th floor           9               5677m
```

(RETURN) Accept      (5) Next         (13) Instructions
(2) First            (6) Mark All
(3) Last             (7) Clear All    (15) Print
(4) Prev                              (16) Exit ( - End - )

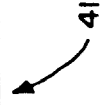

FIG. 8a

```
         1         2         3         4         5         6         7         8
1234567890123456789012345678901234567890123456789012345678901234567890123456789 0
Time Management: Equipment Selection           Monday 07/22/85    2:15 pm
```

| Equipment         | Location  | Control Number | Serial Number |
|-------------------|-----------|----------------|---------------|
| Film Projector    | 8th floor | 3              | 2365p         |
| Overhead Projector| 8th floor | 21             | 5792p         |

```
(RETURN) Save      (5) Next      (9) Select Equipment   (13) Instructions
(2) First                                                (15) Print
(3) Last                                                 (16) Exit
(4) Previous
```

```
         1         2         3         4         5         6         7         8
1234567890123456789012345678901234567890123456789012345678901234567890123456789
*******************************************************************************
Time Management: Scheduling Results Summary       Monday 07/22/85    2:15 pm For: John Smith Date    Start Time   End Time    # Available   Conf. Room   Equipment
x| 07/23/85    1:00 pm    3:00 pm    11 of 11          Y            Y
 | 07/23/85   10:00 am   12:00 pm    10 of 11          Y            Y
 | 07/25/85    9:00 am   11:00 am     9 of 11          Y            N
 | 07/26/85    8:00 am   10:00 am     8 of 11          N            N
 | 07/26/85    2:00 pm    4:00 pm     7 of 11          N            Y (MM·DD YY)   (HH MM)    (HH MM)

(RETURN) View Detail           (7) Send Invitations         (13) Instructions

(15) Print
                                                            (16) Exit
```

```
         1         2         3         4         5         6         7         8
1234567890123456789012345678901234567890123456789012345678901234567890123456789 0
********************************************************************************
Time Management: Scheduling Results Detail           Monday  07/22/85   2:15 pm For: John Smith
Meeting For:       Tuesday   07/23/85
Percent for Acceptance:  75 %      Blocked (B) or Unblocked (U):   X B   U Name                    Available      Time Block
Group Administrator         Y         01 pm:  :  :*:03 pm
Biff Adico                  Y              :  :  :  :
Chuck Bain                  Y              :  :* :  :
George Semetrio             Y              :  :  :  :
Righle Venter               Y              :  :  :  :
Conference Rm A  Bl Fl      Y
Film Projector              Y
Overhead Projector          NC
Katie Braun                 NC
Karen Navy                  NC
Cane Rean                   NC
Joan Dasiel                 NC
```

(- End -)
(2) First          (5) Next                      (13) Instructions
(3) Last           (7) Send Invit                (15) Print
(4) Previous                                     (16) Exit

Time Management: Scheduling Update                        Monday 07/22/85  2:15 pm
                                                          (MM DD YY)
           Calendar/Scheduling Database for Period from 07/22/85 to 07/28/85
                                                          (MM DD YY)

12   1    2    3    4    5    6    7    8    9   10   11   12
                                  AM
07/22 M:--..--..--..--..--..--..--..--..--..**..**..--..--
Sched :  .   .   .   .   .   .   .   . //  //  //  .   .
07/23 T:--..--..--..--..--..--..--..**..--..--..--..--..--
Sched :  .   .   .   .   .   .   . //  .   .   .   .   .
07/24 W:--..--..--..--..--..--..--..*...--..--..--..--..--
Sched :  .   .   .   .   .   .   . /   .   .   .   .   .
07/25 T:--..--..--..--..--..--..--..--..--..*...**..--..--
Sched :  .   .   .   .   .   .   .   .   . /   //  .   .
07/26 F:--..--..--..--..--..--..--..--..--..--..--..--..--
Sched :  .   .   .   .   .   .   .   .   .   .   .   .   .
07/27 S:--..--..--..--..--..--..--..--..--..--..--..--..--
Sched :  .   .   .   .   .   .   .   .   .   .   .   .   .
07/28 S:--..--..--..--..--..--..--..**..**..**..**..--..--
Sched :  .   .   .   .   .   .   . //  //  //  //  .   .
```

(RETURN) Save                                                    (- More -)

(4) View Last Week    (5) View Next Week    (10) Fill Grid     (13) Instructions
                      (6) View AM Hours     (11) Clear Grid    (14) Merge Cal Data
               63     (7) View PM Hours                        (15) Print
                                                               (16) Exit

FIG. 12

MEETING MANAGEMENT DEVICE

BACKGROUND OF THE INVENTION

Due to the constant need to be able to communicate with various co-workers at any time, many businesses currently resort to the use of computer systems for internal communications. Such computer systems provide directory services, internal mail/message services, and calendars or daily, weekly or monthly schedules for each individual.

One computer service associated with the computerized personal calendars especially aids in the scheduling of meetings which require the attendance of invitees with very different schedules. Typically the computer calendar scheduling service allows a user to request a meeting of a specified duration to be held within a range of times and dates, and to include a group of specified people. A comparison is made within the computer of the specified times and dates with each prospective attendee's calendar of events. The results of the comparison is an option list from which the user selects an available meeting time that is common to all prospective attendees. One such computer calendar scheduling service is described in U.S. Pat. No. 4,626,836.

SUMMARY OF THE INVENTION

A problem of infringing the privacy of one's personal calendar exists with currently available scheduling services. The user through the computer must have access to each potential attendee's personal calendar in order for the comparison to be made. Many individuals prefer not to allow such access to other users of the computer system.

In the present invention a common available date and time in which to schedule a meeting is determined without directly accessing each invitee's personal calendar. Instead a separate data file containing the available dates and times of each potential invitee is used with a computer management routine. Within a user specified range of desired meeting dates and times and time duration, the management routine compares available dates and times from the data file of user specified invitees. The comparison results in a determination of at least one common date and time of all specified invitees within the specified time requirements or a determination of up to five common available dates and times of the specified invitees within the specified time requirements. A determined common available date and time is then selected and the meeting may be scheduled for the same.

One feature of the present invention enables the selected and hence, scheduled meeting date and time information to be sent to the specified invitees through electronic mail services of the computer system.

Another feature of the present invention enables equipment and meeting places to be specified and compared with specified invitees for common available dates and times. In this case the management routine determines common available dates and times, within the specified time requirements, of user specified invitees, specified equipment and specified meeting places.

In accordance with one aspect of the present invention, a user may designate which specified invitee's attendance is critical to the meeting and which are non-critical. The management routine then compares the available dates and times of those specified invitees whose attendance is designated as critical. Equipment and meeting places may also be specified as critical, and the comparison is then made between available dates and times of the critical specified invitees, equipment and meeting places. The comparison determines common available dates and times of all the critical specified items including invitees, equipment and meeting places.

In accordance with another aspect of the present invention, the data file indicates available dates and times of each potential invitee based on a combination of sets of defined unavailable dates and times. One set of dates and times are defined by an invitee himself as times for which he is to be known as unavailable. A second set defines as unavailable dates and times, those dates and times selected by other users to schedule meetings to which the invitee has been invited.

In accordance with another aspect of the invention, the first set of dates and times of an invitee is automatically or manually maintained by the invitee. The automatic maintenance is initiated by any changes to the personal calendar of the invitee. The second set of dates and times may be determined by meetings to which the invitee has been invited within a preset amount of time. In a preferred embodiment, the preset amount of time is about 24 hours.

The data file is also kept current such that each set of dates and times begin with the current date. Hence, the present invention provides updating means for deleting passed days and adding future days to each set of dates and times to make each set span the same dates.

BRIEF DESCRIPTION OF THE DRAWINGS

The foregoing and other objects, features and advantages of the invention will be apparent from the following more particular description of illustrative embodiments of the invention, as illustrated in the accompanying drawings in which like referenced characters refer to the same parts throughout the different views. The drawings are not necessarily to scale, emphasis instead being placed upon illustrating the principles of the invention.

FIG. 3 is an illustration of a Meeting List screen of the block diagram of FIG. 2.

FIG. 4 is an illustration of a Meeting Entry screen of the block diagram of FIG. 2.

FIG. 5 is a schematic of the data structure used by the metting file of FIG. 2.

FIGS. 6a and 6b are illustrations of Select People screens of FIG. 2.

FIGS. 7a and 7b are illustrations of Select Conference Rooms screens of FIG. 2.

FIGS. 8a and 8b are illustrations of Select Equipment screens of FIG. 2.

FIG. 9 is a schematic of the data structure used by the scheduling file of FIG. 2.

FIG. 10 is an illustration of a Summary Results screen of FIG. 2.

FIG. 11 is an illustration of a Detail Results screen of FIG. 2.

FIG. 12 is an illustration of a screen displayed during the scheduling maintenance procedure of FIG. 2.

DESCRIPTION OF THE PREFERRED EMBODIMENT

Figure 1:
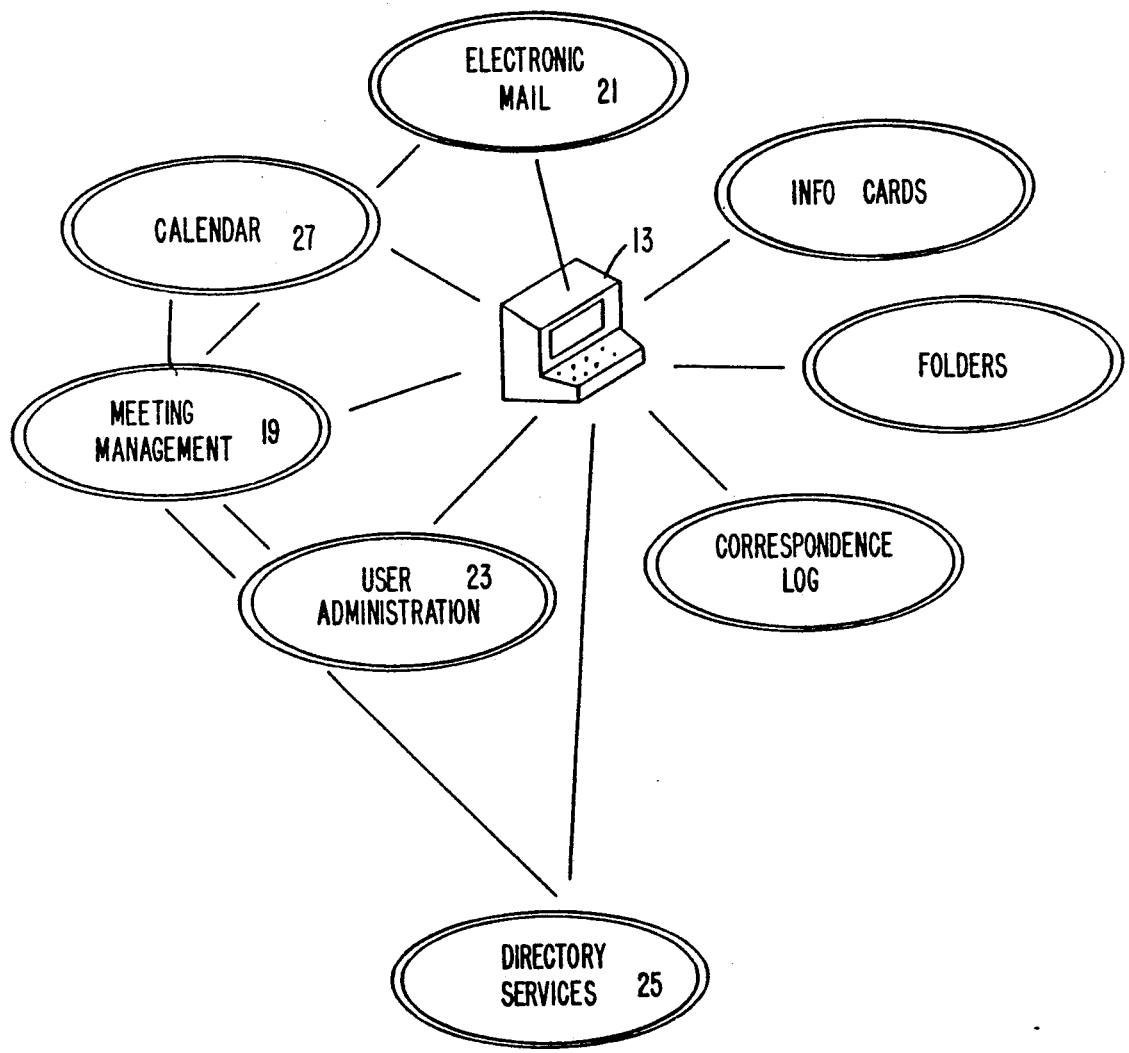
FIG. 1 is a schematic illustration of a computer system with a Meeting Management Service module embodying the present invention.

A schematic illustration of the organization of a computer system embodying the present invention is provided in FIG. 1. In FIG. 1 each of the ovals indicate different applications or proceduralized views of an underlying set of data that the computer system provides. One of the ovals is the Meeting Management service 19 of the present invention. Computer terminal 13 with connecting lines to each oval symbolizes that each computer terminal of the system has direct access to the various applications and their associated databases. The placement of the Meeting Management service 19 is illustrative of the integration of the present invention with an existing computer system with Electronic Mail, Calendar Service, User Administration and Directory Services, among other applications and their associated databases.

Typically, individual users have personal calendars in the Calendar database 27. General information derived from personal calendars of users who participate in Meeting Management 19 is stored in a scheduling file 47 of Meeting Management 19 shown in FIG. 2. Meeting management 19 employs a meeting file 17 of FIG. 2, the scheduling file 47 and Directory Services 25 to define and schedule optimal meeting dates and times. Invitations are sent by Electronic Mail 21 and the meeting is temporarily noted in each invitees record in the scheduling file 47.

Figure 2:
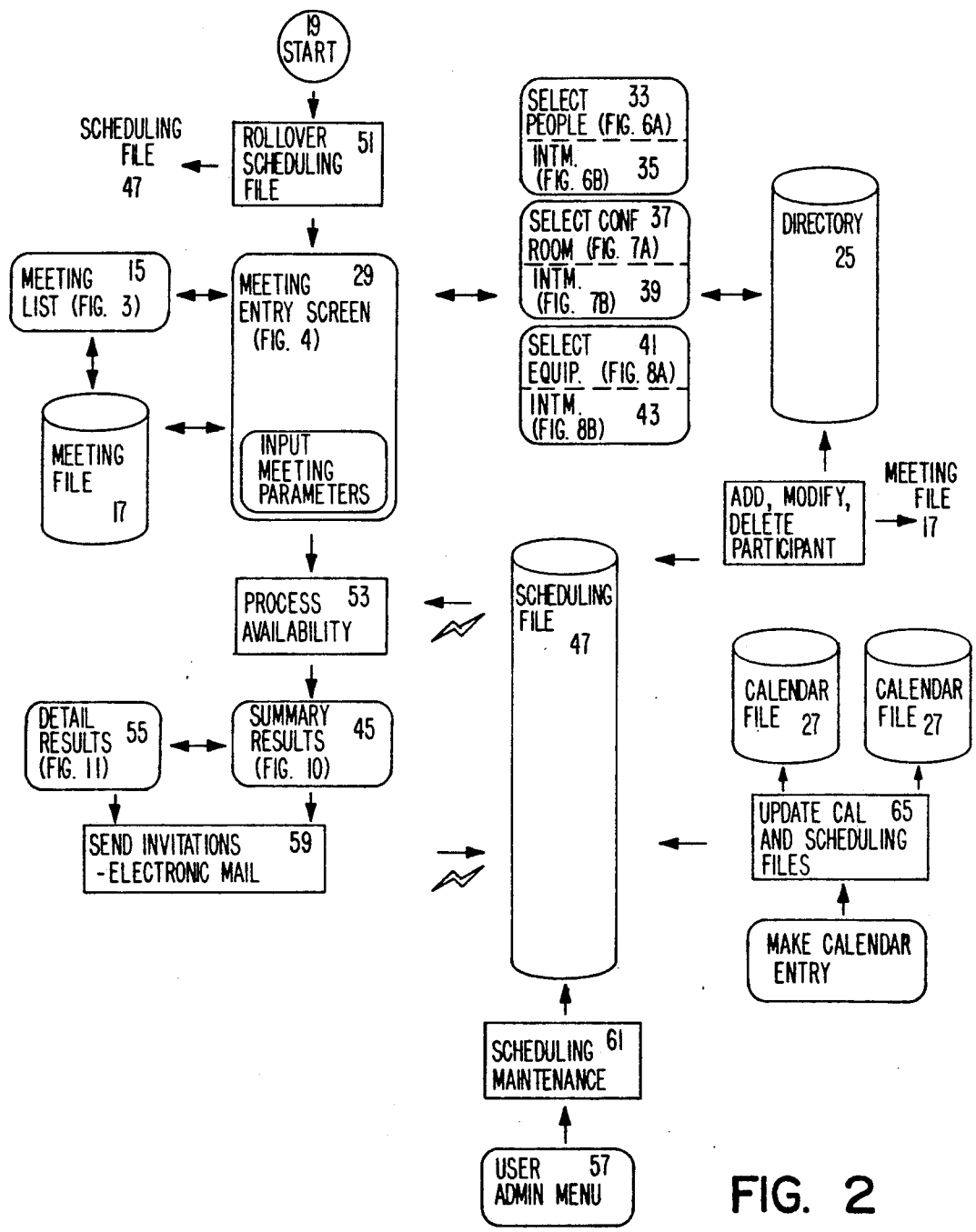
FIG. 2 is a detailed block diagram of the Meeting Management Service of FIG. 1.

A more detailed illustration of the relationship among Meeting Management 19, Electronic Mail 21, Calendar 27, User Administration 23 and Directory Services 25 is provided in FIG. 2. In FIG. 2, boxes with rounded corners illustrate screens shown on a computer terminal. Solid cylinders indicate files of the system; and rectangles indicate processes of the system. Each user must first designate within Directory Services 25 whether he is a participant in the scheduling process of Meeting Management 19. If a user chooses not to participate, no information from his personal calendar is stored in scheduling file 43. His personal schedule is therefore not used in the scheduling process to find the optimal meeting date and time. Said another way, Meeting Management 19 treats him by default as non-critical to any meetings as will be discussed later.

Once a user has accessed Meeting Management 19, a list of meetings which he has previously arranged and saved in the meeting file 17 is shown on a Meeting List screen 15 as indicated in FIG. 2 and shown in detail in FIG. 3. The Meeting List screen 15 of FIG. 3 lists the names of three meetings. User instructions regarding corresponding function keys are displayed at the bottom of the Meeting List screen 15. Function keys 2 through 5 are for movement of the screen. Function keys 6, and 8 enable the user to change the Meeting List. The Return Key enables the user to read details of one of the listed meetings which he has previously arranged and saved in the meeting file 17. The listed meetings can then be modified, deleted and/or processed.

There exists a meeting record in the meeting file 17 for each meeting saved by the user. The meeting record 31 contains data concerning who was invited to the meeting, where and for when the meeting is scheduled, what equipment is included, etc. The data structure of this record 31 is shown in FIG. 5 and is discussed later.

The user gains access to the Meeting Entry screen 29 of FIG. 4 by choosing from screen 15 of FIG. 3 to modify a listed meeting or to initiate the scheduling of a new meeting and generate an associated meeting record. If no meetings exist for that user in the meeting file 15, the Meeting Entry screen 29 is directly presented to the user. This screen 29 prompts the user to key in time, date, invitee and other information about the meeting. Each piece of information keyed in corresponds to a part of the data structure of the meeting record 31 shown in FIG. 5.

The bracketed numbers in FIG. 5 represent the lengths of the respective fields in bytes. In each of the last four fields, the first bracketed number of the pair of bracketed numbers reflects the maximum number of items in that field, each item with the length of the second bracketed number of the respective pair.

Entries may be made directly on Meeting Entry screen 29 of FIG. 4 or they may be selected in the more detailed entry screens 33, 37 and 41 of FIG. 2 accessed by the designated function keys 3, 4, and 9. This permits those users with specific criteria for a meeting to minimize the number of screens to visit. All but one of the fields on this screen 29 are able to be directly entered here. The "Number of Participants" field is completed by the user selecting invitees from a Directory list invoked by pressing function key 9. After the selection process, the user returns to the Meeting Entry screen 29 of FIG. 4 and the number of invitees selected from the list is reflected in that field. The selection process is discussed in detail later.

The user enters or keys in a unique (per user) 24-character meeting name in the "Meeting Name" field of FIG. 4. This is the name that is subsequently listed on the Meeting List Screen 15 of FIG. 3. This name plus the user's unique identification recorded in User Administration directory 23 of FIG. 1 defines the "meeting key" (mtg_key) field of the meeting record 31 of FIG. 5. The meeting key field serves to uniquely identify the record and determines the owner of the meeting.

In the "Duration" field of the Meeting Entry screen of FIG. 4 the user keys in a proposed length of the meeting in hours and minutes. This field has a nine hour maximum range.

By default the system date is initially displayed in the first part of the "Date" field and six days from that date is initially displayed in the second part of that field. Starting at the left-most part of the provided line in the "Date" field of FIG. 4, the user enters the month, date and year of the meeting or a start date of a range of dates in which the meeting can be held. In the latter case, an end date of the range of days on which the meeting can be held must be entered in the right-hand portion of that field. A date prior to the system date will not be allowed. The ending date must not exceed 161 days (23 weeks) from the system date, inclusive of the system date. The maximum range of dates, start date to end date, is 28 days (4 weeks), and the default is one week.

The "Time" field is similar to the "Date" field. Meeting Management system 19 initially displays in the "Time" field the work day hours specified by the user in his user profile stored in the User Administration 23 database. The user enters in the first part of the "Time" field, the start time of the meeting or a start time of a range of times that the meeting can be held. In the latter case, the user enters in the second part of the "Time" field an end time of the range of times that the meeting is desired to be held. As shown in FIG. 4 for example, 8:00 AM has been designated as the starting time of each day for the user in his user profile. Meeting Management 19 then displays 8:00 AM derived from the user profile as the first part of the "Time" field and 5:00 PM as the second part of the "Time" field designating a nine-hour day. The range of hours spanning the time field can be no larger than twelve hours nor can it cross into a second day.

The "Number of Participants" field of FIG. 4 reflects the number of people (invitees) invited to the meeting. The user must press function key 9 as previously mentioned, and is thereafter presented with a Select People screen 33 as indicated in FIG. 2 and shown in detail in FIG. 6a. The user can now select invitees for the meeting from the system Directory 25 by placing an "X" next to the name of each invitee. Upon pressing the Return key to accept these selections, the user is presented with an Intermediate Select People screen 35 shown in FIG. 6b.

The Intermediate Select People screen 35 displays a list of invitees selected from the system Directory 25, with the invitees participating in Meeting Management 19 defaulted to "C" meaning critical and the non-participating invitees defaulted to "N" meaning non-critical. The user may change any critical invitees to "N" for non-critical, but not the converse. The schedules of those invitees designated as "N", non-critical, will not influence the scheduling process to optimize a meeting date and time. Hence, those invitees designated as "N", non-critical, with schedule records will not have their schedule files processed. The user may now press the Return key and save these selections or press function key 16 to exit with no selection of invitees. In each case the user will be returned to the Meeting Entry screen 29 of FIG. 4.

Upon returning to the Meeting Entry screen 29 from the invitee selection process, the number of invitees selected is reflected in the respective field. At any point in this process, from the Meeting Entry screen 29, the user may press the Return key to save the meeting parameters on the respective meeting record 31 in the meeting file 17. The user then may continue with processing or leave the Meeting Management service 19 and come back later to process the data. If the user chooses to continue, and a specified date, time and place are entered, the user could simply press the special function key 5 to initiate the processing of data to obtain the optimal meeting date and time. If meeting parameters of a meeting have already been saved to the meeting file 17 and the user chooses to change parameters, the meeting record must be saved once again to retain the new changes.

In the "Conference Room" field, the user presses function key 3 and arrives at a Select Conference Room screen 37 as shown in FIG. 2 and shown in detail in FIG. 7a. This screen as shown in FIG. 7a displays an example of the list of all the conference rooms that reside in the system Directory 25 database which has been made available for the scheduling process in Meeting Management 19. The user places an "X" next to the name(s) of the desired conference room or rooms. "Conference Room List" appears in the field if more than one conference room is selected. If a particular room is selected, then its schedule will be queried and processed as are the schedules in the scheduling file 47 of the critical invitees. If the user selects more than one conrerence room, an available conference room from those conference rooms will be selected at processing time if the "Critical" field is marked with an "X".

FIG. 7b illustrates an Intermediate Conference Room screen 39 provided by the pressing of the Return key from the Select Conference Room screen 37 so as to accept the marked conference rooms on the Select Conference Room screen 37 of FIG. 7a. The intermediate screen 39 of FIG. 7b is used by the user to decide whether or not the chosen conference room(s) are best for processing the meeting. The user may press function key 9 to return to the Select Conference Room screen 39 of FIG. 7a and modify his choice of conference room(s). By pressing the Return key the user saves the list of chosen room(s). By pressing function key 16 the user cancels the list. In eitner case the user returns to the Meeting Entry screen 29 of FIG. 4.

A user may wish to sohedule the meetinq in some location other than a system Direotory conference room, in which case the user would enter the name of the location at the Meeting Entry screen 29. Similarly the user can specify a non-directory conference room. In eitner case the the "Conference Room" field must specify the location is non-critical. If the "Critical" field corresponding to the "Conference Room" field is marked with an "X", the "X" will be ignored during processing.

On the other hand a user may not care in which conference room the meeting is to be held, thereby eliminating the step of selecting a conference room and leaving that field blank and the corresponding "Critical" field marked with an "X". In that case any available local conference room is selected for that meeting which has a capacity to accommodate the number of invitees.

Another option is the entry of a capacity in the "Room Capacity" field of screen 29 in FIG. 4 combined with the "X" in the "Critical" field corresponding to the "Conference Room" field. This allows the user to ask for any local conference room which participates in Meeting Management 19, with the specified minimum capacity. When a Directory conference room is selected, the "Room Capacity" field is made to reflect the selected room's capacity. It should be noted here that if the user selects a conference room with a smaller capacity than the number of invitees or manually enters a capacity which is too small, a message to that effect will result as the user presses function key 5 to process. This can be overridden and the room scheduled anyway by simply pressing function key 5 again.

The "Equipment" field of screen 29 is completed by the user entering the name of a piece of equipment selected for the meeting.

Alternatively, the user can press function key 4 from the Meeting Entry Screen 29 and access a Select Equipment screen 41 shown in FIG. 2 and shown in detail in FIG. 8a. Select Equipment screen 41 in FIG. 8a displays an example of the list of all the equipment that is listed in the system Directory 25 which has been made available for the scheduling process of Meeting Management 19. A user may not need any equipment for the meeting, and hence would eliminate this step. If a particular one or more pieces of equipment have been selected, then each piece of equipment will be queried and processed as are the critical invitees, providing the selected pieces of equipment have been collectively marked as "critical" in the corresponding "Critical" field of the "Equipment" field on the Meeting Entry screen 29 similar to that of the "Conference Room" field. The user enters an "X" next to the name of the desired equipment of the Select Equipment screen 41 in FIG. 8a. The user then presses the Return key to save these selections and proceed to an intermediate screen 43 shown in FIG. 8b. It should be noted here that there is a limit of five pieces of equipment per scheduled meeting. Should the user choose more than five pieces, a message will alert the user to this condition and some equipment must be deselected.

In FIG. 8b the user reviews the intermediate screen 43 to decide if his choices of equipment are satisfactory. The user then presses the Return key to accept those choices and carry them back to the Meeting Entry screen 29. If the choices are incorrect the user may press function key 9 to return to the Select Equipment screen 41 for further selection, or function key 16 to return to the Meeting Entry screen 29 without saving these choices. When returning to the Meeting Entry screen 29 it should be noted that if more than one piece of equipment has been selected, "Equipment List" will appear in the "Equipment" field.

The default for any specified conference room or equipment is "critical".

The "Percent for Acceptance" field on screen 29 of FIG. 4, reflects how long an invitee may be present at the meeting and still considered available for the meeting at a given time period. For example, 50% acceptanbe would process an invitee as available for a certain date and time if the invitee can attend one half of a meeting scheduled at that time. The default is 100% acceptance.

The user then marks the "B" for blocked or the "U" for unblocked in the respective field labelled "Blocked" or "Unblocked" on screen 29 of FIG. 4. If the percent for acceptance is lower than 100% of the meeting time requirements, then the user must select whether he wants his invitees present in the meeting for a consecutive length of time "blocked" or if it is acceptable to allow tnem to leave and return to the meeting "unblocked". The default for this field is "B" blocked.

In the last field of the Meeting Entry screen 29 of FIG. 4, the user specifies the days of the week to search for available meeting times. This is defaulted to a working week defined by user profile. This provides for international compatability due to the variations in what are considered working weeks in other countries, and in various domestic and foreign professions.

In the data structure of the meeting record 31 of FIG. 5, a double array of 100 elements of 8 bytes each contains the permanent I.D.'s of those persons selected to attend the meeting. This is labeled as the "List of People" field(1st_people). The field of "list of critical flags" (1st_crit_flags) is a double array of 100 elements of 1 byte each. This field lists critical flags corresponding to the list of invitees and tells if the invitee is critical to the meeting. Field "list of conference rooms" (1st_conf_rms) is a double array of 36 elements of 8 bytes. This field lists permanent ID's of the conference rooms which the user has selected to be processed. The field "list of equipment" (1st_equip) is a double array of 5 elements of 8 bytes and lists the permanent ID's of the equipment necessary for this meeting.

After the user has either created a new tentative meeting or modified an already existing tentative meeting, the user initiates the scheduling process by pressing function key 5. When this process is initiated, records in the scheduling file 45 of each critical invitee, conference room marked critical and/or piece of equipment marked critical will be queried based on all the parameters entered in the Meeting Entry screen 29 and corresponding meeting record 31. As a result of this process, a summary list of the top five optimal or most acceptable meeting times is displayed for the user in the Summary Results screen 45 in FIGS. 2 and 10 as will be discussed.

The scheduling file 47 contains a schedule record 49 for each person, conference room and piece of equipment that participates in the Meeting Management service 19 local to that system (computer). Each record provides data representing time availability of a respective person, conference room or piece of equipment. Shown in FIG. 9 is the data structure of each such schedule record 49.

The first field of schedule record 49 of FIG. 9 provides a unique permanent identification of a person, conference room or pieoe of equipment. The identification field is labeled permid_key and is indicated as being 8 bytes long.

The "public template" field (public_tmpl) reflects time availability based on outstanding invitations sent to the respective person, conference room or equipment of the schedule record 49.

The "private template" field (private_templ) reflects time availability based on the information automatically copied from the respective person's calendar and/or data that the.person manually enters in the private template portion of his schedule record 49.

Both the "public template" and the "private template" are bit-maps representing the meeting schedule of each person, conference room or piece of equipment. Each template contains a string of 7728 bits (966 bytes). Each bit within the bit map represents a single half-hour interval that, if set, is considered unavailable time, and if unset, is considered available time. There are 48 bits per day for a floating range of 161 days (23 Weeks).

For each day of use of the meeting Management service 19, the previous day's information is deleted and a blank set of bits representing a new day is appended to the end of the floating range of days. This is accomplished by the rollover procedure 51 shown in FIG. 2. The rollover procedure 51 is performed on each schedule record 49 of the scheduling file 47 upon entry of a user into the Meeting Management scheduling process following screen 29 of FIG. 2. A rollover date stored in the "last rollover date" (last_roll_date) field of the scheduling record 49 of FIG. 9 is compared to the system date. If the sysrem date is prior to or the same as the last rollover date, the rollover procedure 51 does nothing because the rollover of days must be from the last rollover date forward. If the system date is subsequent to the last rollover date, then the rollover procedure 51 calculates the difference between the dates and erases a number of bits equal to 48 times that many days (48 bits for each day) from the beginning of the floating range of days and appends the same amount of bits to the end of the floating range of days to extend the scheduling window to fill 161 days. The rollover procedure 51 is a necessary concept to the present invention. If no such "rollover" was performed after each day, then days which have already passed and are of no use to the scheduling process would exist within the floating range. The floating range then would have a decreased number of days (less than 161) on which the scheduling process would be able to query. Hence, the present invention applies the rollover procedure 51 to all schedule records 49 in scheduling file 47 whenever the first user, in a given day, of Meeting Management 19 processes a meeting through screen 29 of FIG. 2.

The "public" and "private templates" for conference rooms and equipment are maintained in a similar manner as those on the schedule records 49 of people.

The last field of the schedule record 49 of FIG. 9 is the "record type" (record_type). This field determines the object (person, conference room or equipment) to which the record refers.

After the rollover procedure is performed, the Meeting Management scheduling process performs a determination of availability which is indicated by the process 53 in FIG. 2. This is accomplished by a query processor initializing a solution table with entries for each possible start time within the time range specified by the user as reflected on the meeting record 51. Each table entry serves as a counter for a particular meeting time. Each critical participant's (invitee's, conference room's and equipment's) "private" and "public templates" is then evaluated for each or the time slots that the meeting being processed has created in the query solution table. The evaluation takes into consideration the blocking and percent of acceptance factors, and is bound by the "range of days", "range of times" and "days of the week to search" parameters.

Each critical participant that meets the qualifying criteria causes the query processor to increment the associated counter for that time slot in the solution table. Tne query processor evaluates critical participants in order of people (invitees), then conference rooms, and lastly equipment. When all possible meeting times are evaluated for each critical participant, the five time slots which have counted the highest are retained for display on the Summary Results screen 45 of FIGS. 2 and 10 for the user processing the meeting to view.

A Summary Results screen 45 displays the top five counting time slots of the solution table as the five most acceptable solutions. An illustration of the Summary Results screen 45 is provided in FIG. 10. The first entry shown in the list of solutions is the optimum meeting time and is marked as the default choice for scheduling the meeting. However, the user can position the cursor next to any desired entry and depress function key 7 to tentatively schedule the meeting for that entry and invoke the Send Invitations procedure 59 of the Electronic Mail directory 21.

The user can review details of any entry in the list displayed on the Summary Results screen 95 by positioning the cursor next to the entry and pressing the Return key to arrive at a Detail Results Screen 55 as shown in FIGS. 2 and 11. This screen shows a detailed view of the combination of "public" and "private templates" of each critical participant (invitee, conrerence room and/or equipment). In the Detail Results screen 55 of FIG. 11, each asterisk denotes a half hour of an hour block between exclamation marks for which a participant is busy. A participant's time block having a single asterisk thus means the participant is unavailable for half an hour out of the two hour designated Time Block. However, such a participant is processed as available for a meeting during this time which is indicated by the "Y" in the "Available" column because the Percent for Acceptance factor is 75%. That is, the participant is available for at least 75% of the time within the Time Block of 1:00 PM to 3:00 PM. Also, the pattern of the available and unavailable half-hour segments per participant shows if his available time is in one contiguous block as may be required if the user selected the "Blocked" field on the Meeting Entry screen 29.

Also shown on the Detail Results screen 55, at the end of the list, are the non-critical participants. "NC" denotes non-critical participants, and "NP" denotes invitees not participating in the Meeting Management service 19. No time schedules are shown for the non-critical participants because they have not been processed. In order for the user to see the time schedules for each non-critical participant, he must select each as critical on the Meeting Entry screen 29 and reprocess with the new meeting parameters.

The Detail Results screen 55 is for display only, for the user to evaluate, if desired, the results of a particular time slot solution of the scheduling process. After the user views the detail of a particular meeting solution and decides to schedule the meeting for this time, he may directly invoke Send Invitations procedure 59 through Electronic Mail 21 by depressing function key 7. In the Send Invitations procedure 59 the user is provided with the opportunity to insert more information in text form on the invitations before actually sending the invirations. The invitations are sent to both critical and non-critical invitees. The sending of an invitee's invitation automatically updates the public templare field of his schedule record if he is a participant of the Meeting Management service 19 and is critical to this meeting and thus completes the cycle of Meeting Management 19.

As previously mentioned, the "private" template field of a person's schedule record can be changed by various methods. A user gains access to his private template through the main menu screen 57 of the User Administration Directory 23 shown in FIG. 2. Once the user has gained access, a Scheduling File Maintenance routine 61 provides a Shadow Calendar screen 63 of FIG. 12. Shadow Calendar screen 63 shows a grid which displays data for the morning hours of one week per screen. Beginning with the first date represented in the private template, the days of the week and respective dates are displayed along the left hand side of the grid. There are two lines of information per day. The first line of information of each day represents data currently stored in the user's calendar in the Calendar Database 27 and uses an asterisk to designate each filled (unavailable) half-hour time segment. This line for each day is not modifiable from Shadow Calendar screen 63. It is only modifiable by changes made to the user's calendar in the Calendar Database 27 through Update Calendar procedure 65 shown in FIG. 2.

The second line for each day in the Shadow Calendar screen 63 of FIG. 12 represents the current contents of the private template field in the scheduling record of the respective user. A slash indicates a filled (unavailable) half-hour and is inserted manually by tne user, or automatically by the system through the Update Calendar procedure 65 whenever a change is made in the user's calendar. The automatic option is set in the user's profile in the Directory database 25. In the automatic mode, each slash will mirror an asterisk but the user is still able to manually remove the slashes and manually insert other slashes on the Shadow Calendar screen 63 through the Scheduling File Maintenance routine 61.

To manually modify the second line of each day in the Shadow Calendar screen 63, the user presses the slash key to enter a slash and presses the space bar to remove a slash. Function key 14 enables the user to merge or "flush" all the user's Calendar information into the private template field in his schedule record which is reflected on the Shadow Calendar screen 63.

Other function keys enable the user to fill the grid with slashes to represent the user is unavailable or to clear the grid of slashes to represent the user is available. In either case the user's calendar in the Calendar database 27 is unchanged and so are the asterisks in the Shadow Calendar screen 63 of FIG. 12. The slashes are to merely give others and the scheduling process an impression of the user's availability or non-availability as the user chooses.

Other function keys of screen 63 enable the user to view the other weeks within the 23 weeks (161 floating range of days) of the Meeting Management scheduling window. To view evening versus morning hours, the user presses function key 7. The Return key must be pressed to save all changes made to the private template field of the user's schedule record. Or, function key 16 may be pressed to delete changes and leave the user's schedule records 49 of the scheduling file 47 as they were upon entry to the Scheduling File Maintenance routine 61.

Although a user has an automatic option to update his private template, he must still use the Scheduling File Maintenance routine 61 in at least one instance. When a user makes a calendar entry beyond the 161 day scheduling window of Meeting Management 19, the system cannot automatically copy that entry on the private templat.e field because that date does not yet exist in that field. Thus, when rollover occurs and the scheduling window has been made to include that date the automatic entry does not appear in the private template field. The user must employ the Scheduling File maintenance routine 61 and manually insert the entry to reflect the calendar entry which was previously made.

Figure 13:
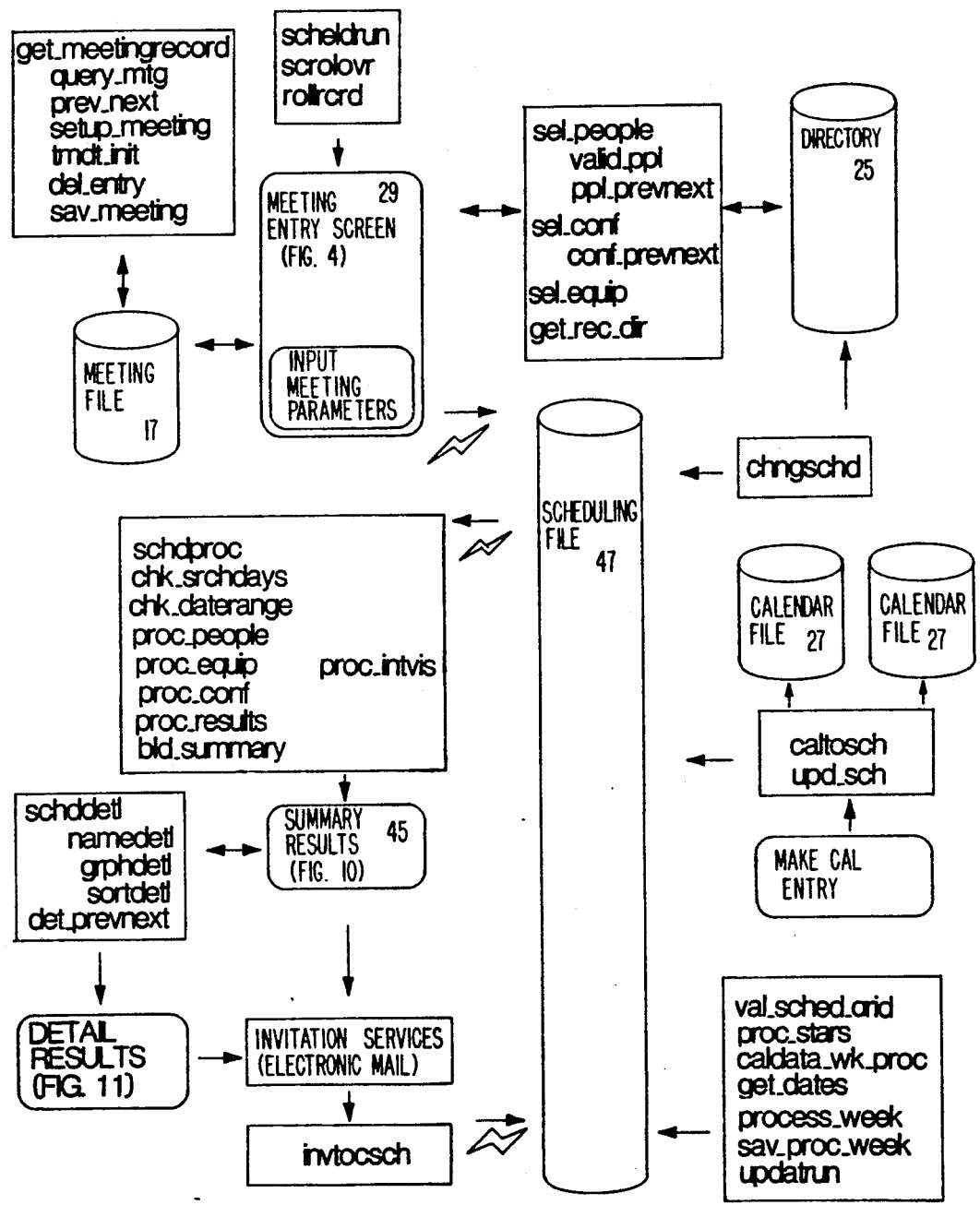
FIG. 13 is a block diagram of the computer program of the Meeting Management of FIG. 1.

A flow chart of the computer program of the Meeting Management service 19 is provided in FIG. 13. Entry to the Meeting Management service 19 calls an initial module "schedrun" which opens the meeting and scheduling files 17 and 47 respectively, through respective COBOL routines and which initializes function keys screen displays and messages for the user. Also Schedrun performs some security checking and calls scrolovr to update (rollover) the private and public templates of each schedule record 49 in scheduling file 17. Rollrcrd, a subroutine of scrollovr performs the actual rolling over by deleting lapsed days and appending new future days to the templates.

Schedrun displays the tentative scheduled meetings on the Meeting List screen 15 after reading all the meeting records 31 of the user from the meeting file 17. Schedrun calls del_entry to delete any entry from the Meeting List screen 15 and correspondingly from the meeting file 17, on command of the user who is viewing screen 15. Based on the entry selected by the user from the Meeting List screen 15, Schedrun calls get_meeting_record to copy records of tentative meetings from the meeting file 17 into display buffers of the Meeting Entry screen 29. Schedrun then calls setup_meeting which governs the display of the Meeting Entry screen 29.

If an existing tentative meeting is to be displayed, setup_meeting produces the copied data from the display buffer. If a new meeting is being structured, a blank Meeting Entry 29 screen with defaults is displayed and a corresponding block in the display buffer is initialized. In the former case, del_entry can be requested through setup_meeting on command of the user to delete the tentative meeting. In the latter case, several program routines are employed to build a new tentative meeting record in the display buffer from the information supplied by the entries of the user. Also, Setup_meeting calls tmdt_init which sets up defaults for starting and ending Date and Time, and Days to Search fields of the Meeting Entry Screen 29 prior to display of the screen.

Among the building routines are sel_people, sel_conf and sel_equip. Each of these routines use get_rec_dir to read the Directory database 25 and obtain display information about people, conference rooms and equipment. Sel_people calls valid_ppl to validate that the invitees selected and marked critical at the Intermediate Select People screen 35 of FIG. 6b participate in Meeting Management 19 and are thus eligible to be marked as "C" critical. Sel_people also calls ppl_prevnext which positions pointers in the display buffers of the Intermediate Select People Screen 35 and enables the PREV and NEXT keys on the terminal keyboard and their display messages for screen 35.

Sel_Conf calls conf_prevnext to position pointers in the display buffers of the Intermediate Select Conference Room screen 39 of FIG. 7b and enables the PREV and NEXT keys and respective display messages for that screen 39.

Once the user has indicated his completion of the Meeting Entry screen 29, set_up meeting calls entry_val to validate the information supplied on screen 29. On command of the user to save Meeting Entry screen 29, save_meeting writes the data from the Meeting Entry Screen display buffers onto a record in meeting file 17. Similarly, fill_mtg_rec copies all data from the Meeting Entry screen display buffers onto respective meeting records 31 of the meeting file 17 prior to processing.

After the user has pressed the function key to begin the processing of a completed meeting record, setup_meeting calls extra_ent_val which performs a final error check before actual processing.

Setup_meeting next calls schdproc which is the main module for the determination of availability. Schdproc calls the routines which actually do the processing. In addition, Schdproc calls the routines to prepare the Summary results Screen 45.

Schdproc first calls date range and day checking routines, chk_srchdays and chk_daterange. The former verifies that a minimum of one valid day in the date range was specified in the meeting parameters against the "Days to Search" field of the Meeting Entry screen 29 of FIG. 4. This routine also builds a table of search flags for the date range. Each entry in the table represents whether a particular day should be searched.

The latter routine, chk_daterange, verifies that some portion of the user specified date range lies within the scope of the 161 day scheduling window.

Schdproc calls routines proc_people, proc_equip and proc_conf to query availability of specified critical invitees, equipment and conference rooms, respectively. Proc_people, proc_equip and proc_conf each call proc_intvls which does the actual availability processing. Proc_intvls sets up the solution table with an entry corresponding to each time slot as defined by the date and time ranges and the algorithm previously described. Each critical invitee is evaluated for each time slot. If the invitee is available, the counter associated with the time slot is incremented. The same is then done for each piece of equipment. Conference rooms are then evaluated until one nas been found for each time slot. A subroutine of routine proc_conf verifies that the capacity of the conference room about to be processed is greater than or equal to the number of people selected. If there is no conference room "available", the closest fit is then selected.

After the solution table has been completed, proc_results evaluates the table constructed in proc_intvls and extracts the five best solutions. If less than five solutions exist, then proc_results extracts as many solutions as are available.

Schdproc then calls bld_summary which constructs display buffers for the Summary Results screen 45. The five or less solutions are then displayed on the Summary Results Screen 45 in the format shown in FIG. 10.

After the schdproc module has completed processing, module schddetl builds the Detail Results screen 55 through routines namedetl, grphdetl and sortdetl. Namedetl is called for each invitee and extracts the user display information from the system Directory 25 and fills the Detail Results screen display buffer with the invitee's name and criticality. Grphdetl builds a graphic representation of the availability of each critical invitee for the time slot associated with the result being viewed. Sortdetl sorts the results in the following hierarchy, Critical/Available=Y, Critical/Not Available=N, Not Critical=NC, Not Participating =NP, and Not Found=NF where Y>N> NC>NP>NF.

Once the user has chosen one of the five determined solutions and mails invitations to the invitees, routine invtosch updates the public templates of all the local critical invitees, the chosen critical conference room and the critical equipment to reflect the date and time of the newly scheduled meeting.

It is understood that Meeting Management 19 can be incorporated in a network of computer systems each having a scheduling file of different groups of people. In such a network, users may query either local or remote scheduling objects for availability of invitees, conference rooms or equipment. Function keys on the Meeting Entry screen 9 of FIG. 4 specify "local" or "all" for "Select Equipment" and "Select Conference Rooms". "All" refers to a listing of both local and remote equipment or conference rooms, and "local" refers to the listings as previously discussed. Meeting Management 19 then employs remote processing between remote scheduling files and the local processing routines, such those involved with the Meeting Entry screen 29 and Schdproc. Also, remote processing of the sending of the invitations through electronic mail directories of each system would occur. These areas of remote processing are indicated by the lightning bolt lines in FIG. 2.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. Apparatus for scheduling a meeting in which potential invitees each have a personal calendar of events stored in a computer system, the apparatus comprising:
   scheduling file means for indicating available dates and times of potential invitees, the scheduling file means being a separate accessible memory element from the personal calendars but having contents determined from contents of the personal calendars, the personal calendars of respective potential invitees being inaccessible by others to provide privacy; and
   management means for determining common available dates and times of specified invitees from the scheduling file means in a manner free of access to the persona calendars to maintain privacy thereof, the management means providing an indication of at least one common available date and time to schedule a meeting.

2. Apparatus as claimed in claim 1 further comprising electronic mail means responsive to the management means for sending to the specified invitees a scheduled meeting date and time selected from the at least one indicated common available date and time.

3. Apparatus as claimed in claim 1 wherein each specified invitee is designated by criticality of his attendance at the meeting being scheduled, said management means determining common available dates and times of only the specified invitees whose attendance is designated as critical.

4. Apparatus as claimed in claim 1 wherein said indication of at least one common available date and time comprises a user readable list of determined common available dates and times from which the user selects a meeting time and date to be scheduled.

5. Apparatus as claimed in claim 1 wherein said scheduling file means include indications of available dates and times of meeting places such that said management means determine common available dates and times of specified invitees and specified meeting places.

6. Apparatus as claimed in claim 5 wherein said scheduling file means further include indications of available dates and times of equipment such that said management means determine common available dates and times of specified invitees, meeting places and equipment.

7. A method as claimed in claim 1 wherein said scheduling file means comprise a plurality of bit maps each having bits which represent time increments, and each bit map providing available dates and times of a potential invites.

8. Apparatus as claimed in claim 7 further comprising date rollover means for updating the bit maps such that the bit maps of each potential invitee span a range of current dates.

9. A method as claimed in claim 1 wherein said scheduling file means comprise:
   first data means for each potential invitee to designate desired dates and times in which he is to appear to be unavailable; and
   second data means for designating dates and times for which potential invitees are unavailable according to proposed meetings, the designated dates and times including dates and times of proposed meetings to which a potential invitee has been invited and which are unentered on his personal calendar, the dates and times of proposed meetings being dates and times of outstanding invitations.

10. Apparatus as claimed in claim 9 wherein said first data means are automatically maintained with changes made to the personal calendar of the potential invitee.

11. Apparatus as claimed in claim 9 wherein said first data means are automatically or manually maintained.

12. Apparatus as claimed in claim 9 wherein said second data means designate as unavailable, dates and times of other scheduled meetings to which the potential invitee has been invited within a preset amount of time.

13. Apparatus as claimed in claim 12 wherein said preset amount of time is about 24 hours.

14. Apparatus as claimed in claim 9 further comprising date rollover means for updating the first and second data means to span a range of dates beginning with the present date.

15. Apparatus as claimed in claim 1 wherein said managemetn means includes user specified parameters for defining available times of specified invitees as a percentage up to 100% of a specified time duration ofthe meeting.

16. Apparatus as claimed in claim 15 wherein said user specified parameters include a percentage amount and an indication of consecutiveness of available time segments.

17. Apparatus for scheduling a meeting, the apparatus comprising:
 schedule file means for indicating available dates and times of potential invitees, said schedule file means comprising a plurality of bit-maps each ahving bits which represent time increments, and each bitmap providing available dates and times of a potential invitee;
 means for specifying invitees and for designating attendance by certain specified invitees as critical, the remaining specified invitees being designated as non-critical, the means for specifying and designating providing a list of specified invitees; and
 management means for determining from the schedule file means, common available dates and times of only the critical specified invitees according to the list of specified invitees, the management means distinguishing critical specified invitees from non-critical specified invitees in the list of specified invitees, and providing an indication of at least one common available date and time to schedule a meeting.

18. Apparatus as claimed in claim 17 further comprising data rollover means for updating the bit maps such that the bit maps of each potential invitee span a range of current dates.

19. Apparatus for scheduling a meeting, the apparatus comprising:
 schedule file means for indicating available dates and times of potential invitees, said schedule file means comprising:
 (a) first means for each potential invitee to designate desired dates and times in which he is to appear to be unavailable; and
 (b) second means for designating dates and times for which a potential invitee is unavailable due to proposed meetings, the designated dates and times including dates and times that have been selected to schedule proposed meetings to which the potentia invitee has been invited but which are unentered on his personal calendar such that the dates and times of the proposed meetings are dates and times of outstanding invitations involving the potential invitee;
 means for specifying invitees and for designating attendance by certain specified invitees as critical, the remaining specified invitees being designated as non-critical, the means for specifying and designating providing a list of specified invitees; and
 management means for determining from the schedule file means, common available dates and time of only the critical specified invitees according to the list of specified invitees, the management means distinguishing critical specified invitees from non-critical specified invitees in the list of specified invitees, and providing an indication of at least one common available date and time to schedule a meeting.

20. Apparatus as claimed in claim 19 wherein said second means designate as unavailable, dates and times of other scheduled meetings to which the potential invitee has been invited within a preset amount of time.

21. Apparatus as claimed in claim 20 wherein said preset amount of time is aobut 24 hours.

22. Apparatus as claimed in claim 19 wherenis iad first means are automatic or manual.

23. Apparatus as claimed in claim 19 further comprisnig data rollover means for updating the first and second means to span a range of current dates.

24. Apparatus for scheduling a meeting, the apparatus comprising:
 schedule file means for indicating available dates and times of potential invitees,
 means for specifying invitees and for designating attendance by certain specified invitees as critical, the remaining specified invitees being designated as non-critical, the means for specifying and designating providing a list of specified invitees; and
 management means for determining from the schedule file means, common available dates and time of only the critical specified invitees according to the list of specified invitees, the management means distinguishing critical specified invitees from non-critical specified invitees in the list of specified invitees, and providing an indication of at least one common available date and time to schedule a meeting, said management means including user specified parameters for defining available times of critical specified invitees as a percentage up to 100% of a specified time duration of the meeting.

25. Apparatus as claimed in claim 24 wherein said specified parameters include a percentage amount and an indication of consecutiveness of available time segments.

26. Apparatus for scheduling a meeting comprising:
 schedule file means for indicating available dates and times of potential invitees, and potential meeting rooms independently of a calendar of events, the schedule file means being separately accessible from the calendar of events, and the calendar of events being private to certain users and inaccessible to other users; and
 management means for determingin common available dates andtimes of specified invitees and specified meeting rooms from the schedule file means in a manner free of access to the calendar of events to maintain privacy therof, the management means providing an indication of at least one common available date and time to schedule a meeting.

27. Apparatus as claimed in claim 26 wherein said schedule file means include indications of available dates and times of pieces of equipment such that said management means determines and provides an indication of common available dates and times of specified invitees, specified meeting rooms and specified equipment.

28. A method of scheduling a meeting with personal calendars of potential invitees stored ina computer system, the steps comprising:
 specifying invitees, a range of dates and times within which the meeting is desired to be held, and a desired time duration of the meeting, the range of dates and times with the time duration defining time requirements of the meeting;

comparing in said computer system, in a manner free of access to the personal calendars, available dates andtimes, which are witin the time requirements of the meeting, of each of the specified invitees with each other to determine common available dates and times, within the time requirements, of the specified invitees, the personal calendars being private to respective invitees and inaccessible to others; and selecting from the determined common available dates and timesm a date andtime to schedule the meeting.

29. A method as claimed in claim 28 further comprising the step of sending to the specified invitees the selected and scheduled meeting date and time through said computer system.

30. A method as claimed in claim 28 wherein:

the step of specifying invitees includes designating certain invitees as critical and remaining invitees as non-critical; and the step of comparing comprises comparing available dates and times, within the time requirements of each of the critical invitees with each other to determine common available dates and times.

31. A method as claimed in claim 28 wherein:

the step of specifying invitees further includes specifying equipment and meeting sites; and the step of comparing further includes comparing available dates and times, within the time requirements, of the equipment and meeting sites with that of each of the invitees to determine common available dates and times within the time requirements.

32. A method as claimed in claim 28 wherein said step of comparing available dates and times includes for each invitee the step of:

updating a span of the available dates and times such that only available dates and times of present and future days are compared.

33. A method as claimed in claim 28 wherein said step of comparing available dates and times includes for each invitee the step of:

combining a first set of unavailable dates and times defined by the invitee with a second set of unavailable dates and times defined by proposed meetings to which the invitee has been invited and which are unentered on his personal calendar.

34. A method as claimed in claim 33 wherein the first set of unavailable dates and times is maintained by automatic or manual means.

35. A method as claimed in claim 34 wherein the automatic means are initiated by changes made to the personal calendar of the invitee.

36. A method as claimed in claim 33 wherein the second set of unavailable dates and times is defined by other scheduled meetings to which the invitee has been invited within a preset amount of time.

37. A method as claimed in claim 36 wherein the preset amount of time is about 24 hours.

38. A method of scheduling a meeting, using a compueter system, the steps comprising:

specifyign critical and non-critical physical components of the meeting, a range of dates and times within which the meeting is to be held, and a time duration fo the meeting, the range of dates and times with the time duration definign time requirements of the meeting;

comparing within said computer system available dates and times, within the time requirements, of each of the critical physical components with each other to determine at least one common available date and time within the time requirements, the comparing performed in a manner free of access to stored calendars of events of respective physical components, the stored calendars being private to certain users and inaccessible to tohers; and selecting a determined common available date and time.

39. A method as claimed in claim 38 wherein the step of specifying critical and non-critical components includes specifying critical and non-critical invitees, equipment and meeting sites.

40. A method as claimed in claim 39 further comprising the step of sending through the computer system the selected date and time to the specified critical and non-critical invitees.

41. A method as claimed in claim 39 wherein the step of comparing available dates and times of each ofthe critical physical components includes, for each critical invitee, the step of:

combining a first set of unavailable dates and times defined bythe invitee with a second set of unavailable dates and times defined by proposed meetings to which the invitee has been invited and which are unentered on his personal calendar.

42. A method as claimed in claim 41 wherein the first set of unavailable dates and times is maintained by automatic or manual means.

43. A method as claimed in claim 41 wherein the second set of unavailable dates and times is defined by other scheduled meetings to which the invitee has been invited within a preset amount of time.

44. A method as claimed in claim 43 wherein the preset amount of time is about 24 hours.

45. A method as claimed in claim 41 wherein the step of combining a first and second set of unavailable dates and times includes updating a span of unavailable dates and times in each first and second set such that only current unavailable dates and times are indicated in the first and second sets.

* * * * *

UNITED STATES PATENT AND TRADEMARK OFFICE
CERTIFICATE OF CORRECTION

PATENT NO. : 5,124,912

DATED : June 23, 1992

INVENTOR(S) : Hotaling, Denier, Ottaviano, Demetriou

It is certified that error appears in the above—identified patent and that said Letters Patent is hereby corrected as shown below:

On title page, item [75]

Inventors Name: Change "Gerald" to --Gerard--.

Signed and Sealed this

Third Day of August, 1993

Attest:

MICHAEL K. KIRK

Attesting Officer

Acting Commissioner of Patents and Trademarks